United States Patent [19]

Dudziak

[11] 4,055,079
[45] Oct. 25, 1977

[54] CYLINDER FIRING INDICATOR
[75] Inventor: Thaddeus J. Dudziak, Nashua, N.H.
[73] Assignee: The United States of America as represented by the Secretary of the Army, Washington, D.C.
[21] Appl. No.: 712,630
[22] Filed: Aug. 9, 1976
[51] Int. Cl.² .......................................... G01M 15/00
[52] U.S. Cl. ...................................... 73/117.3; 324/15
[58] Field of Search ............... 73/117.2, 117.3, 115, 73/116; 324/15, 16 R, 16 T

[56] References Cited
U.S. PATENT DOCUMENTS

| 3,512,079 | 5/1970 | Wanninger | 324/16 T |
| 3,650,149 | 3/1972 | Howes | 73/117.3 |
| 3,765,233 | 10/1973 | Germann | 73/117.2 |
| 3,820,013 | 6/1974 | Gaudette et al. | 324/16 T |

Primary Examiner—Richard C. Queisser
Assistant Examiner—Anthony V. Ciarlante
Attorney, Agent, or Firm—Peter A. Taucher; John E. McRae; Nathan Edelberg

[57] ABSTRACT

In a cylinder compression test apparatus for a spark ignition engine, improved means for generating an electrical pulse representing the fire period for a selected cylinder. The mechanism is useful during engine compression test for correlating each measured waveform with the cylinder that produced that particular waveform.

1 Claim, 3 Drawing Figures

CYLINDER FIRING INDICATOR

The invention herein described was made in the course of a subcontract awarded by TRW Inc. to RCA Corporation, using funds provided under development Contract DAAE07-73-C-0268 between TRW Inc. and the Department of the Army.

The invention described herein may be manufactured, used, and licensed by or for the Government for governmental purposes without payment to me of any royalty thereon.

BACKGROUND AND SUMMARY OF THE INVENTION

U.S. Pat. No. 3,765,233 issued on Oct. 16, 1973 in the name of Reimar Germann shows circuit means for testing the compression in the cylinders of spark ignition engines. Included therein is a clamp type pickup 11 for generating an electrical pulse $e$ when the No. 1 cylinder is firing. The pulse is applied to the first step $12_1$ of a shift register for synchronizing or starting purposes. The shift register output signals $g$, $h$, $i$ and $j$ trigger flip-flops $14_1 - 14_4$ for different ones of the engine cylinders. Pickup 11 synchronizes the shift register with the engine so that waveform measurements are applied to the correct flip-flop.

Applicant has discovered that clamp type pickups do not always adequately distinguish one cylinder from another. For example, a passive inductive pickup was found to be sensitive to more than one cylinder firing, therefore not useful for cylinder identification. The present invention substitutes for such a passive inductive pickup a direct hardwire connection to the high tension electrode in the No. 1 cylinder. The pickup is preferably designed to produce an output pulse of suitable magnitude and width to trigger a flip-flop or other readout device.

THE DRAWINGS

Figure 1:
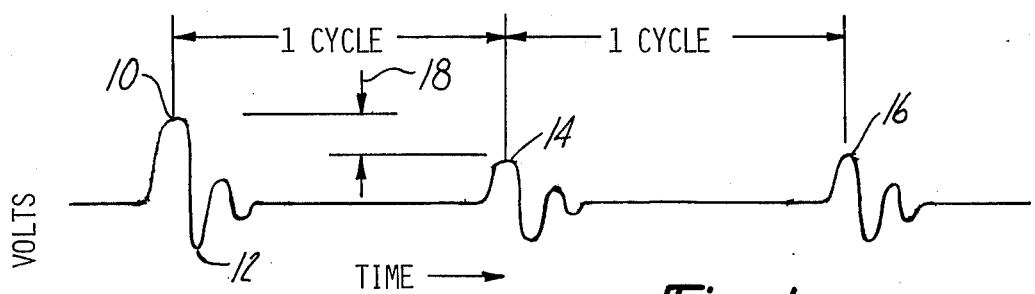
FIG. 1 is a voltage-time curve for a conventional inductive clamp-type pickup used to detect the firing of the No. 1 cylinder in an engine undergoing compression test.
Figure 2:
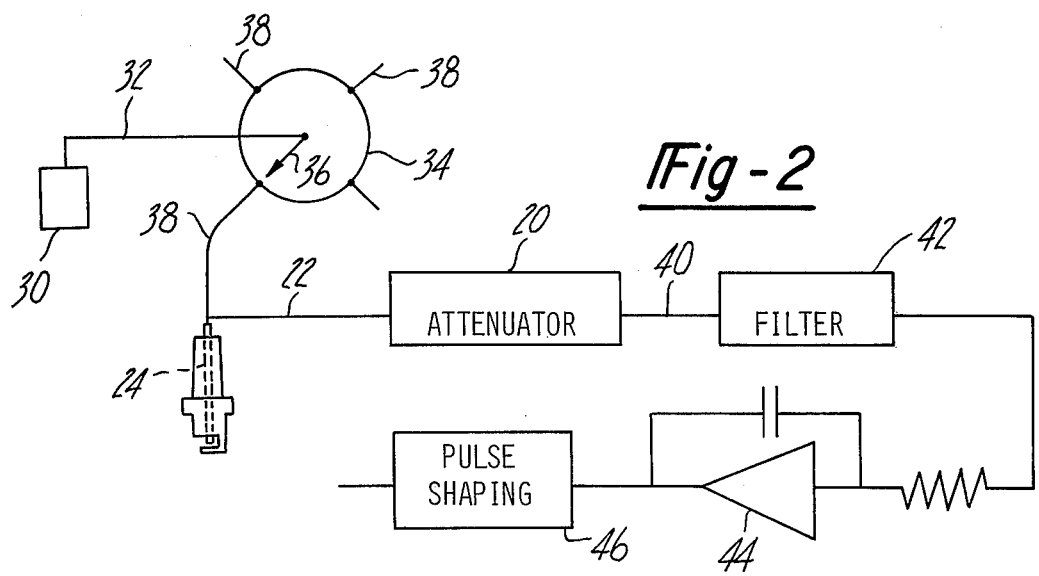
FIG. 2 is a schematic circuit diagram for a cylinder firing detector embodying the present invention.
Figure 3:
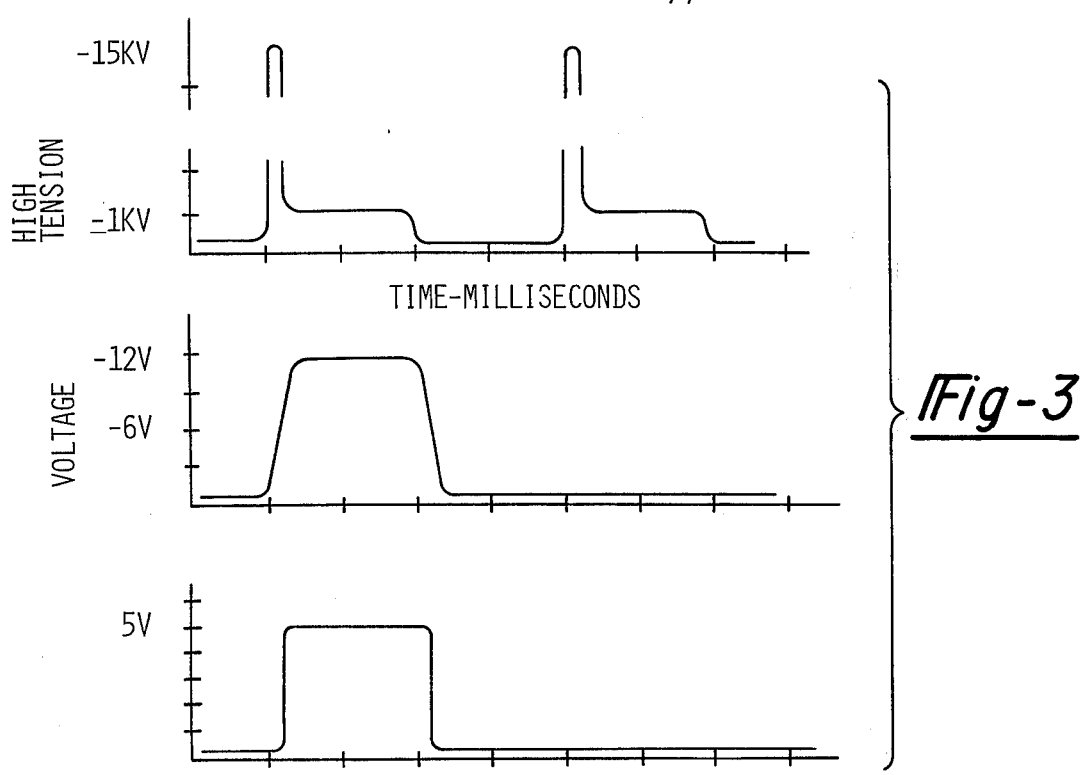

FIG. 3 illustrates voltage-time curves at different locations in the FIG. 2 circuit. FIG. 1 shows the detecting ability of an inductive pickup clamped on the ignition wire leading to the No. 1 cylinder in a multi-cylinder engine undergoing compression test. The pickup arrangement would be generally similar to pickup 11 in U.S. Pat. No. 3,765,233. As seen in present FIG. 1, the signal voltage fluctuates between a high value 10 at beginning of the firing cycle for the No. 1 cylinder to a low value 12 after conclusion of the firing cycle. During the next firing cycle (for the No. 3 cylinder) the pickup receives an undesired input due to stray inductance effects generated in the No. 3 cylinder ignition wire. Such stray inductance causes pickup 11 to produce another peak voltage at time 14. A further peak voltage is produced by the firing of cylinder No. 4 at time 16.

The inductive pickup has difficulty in correctly identifying the cylinder that is to act as the synchronizing or resetting element for the test system. Difficulties are due to the low value of true peak 10 in relation to false peaks 14 and 16. The differential 18 between the true and false peaks is insufficient or uncertain.

FIG. 2 illustrates an alternate pickup arrangement of the present invention wherein an attenuator 20 has a hardwire connection 22 with the high tension electrode 24 for the selected timing cylinder, e.g. the No. 1 cylinder. The ignition system conventionally compreses a coil (transformer) 30 having a wire 32 going from its secondary winding to the distributor 34. A rotor 36 driven by the engine distributes the high voltage to the various lead wires 38 going to the four cylinders (spark plugs) of the engine.

During the firing cycle the voltage at high tension electrode 24 rapidly rises to about 15 kilovolts. As shown in the upper graph in FIG. 3, the voltage almost immediately drops down to about 1 kilovolt for the remaining portion of the firing period, in this example about two milliseconds. The one kilovolt limit could be as low as 300 volts, under certain circumstances of engine operation. These circumstances are usually due to abnormal operating conditions within the firing cylinder. The upper curve in FIG. 3 shows a second firing cycle at the next plug. The central and lower graphs in FIG. 3 show an attenuated signal derived from high tension electrode 24; the attenuated signal is essentially extinguished until the No. 1 cylinder is next fired.

The voltage at high tension electrode 24 is applied to an attenuator 20 which preferably has an attenuation ratio of at least about one thousand to one. Therefore the peak voltage in output line 40 is relatively low, less than 20 volts. The reproduced attenuated signal in line 40 contains a voltage spike which is removed by applying the signal to a low-pass-filter 42 having the capability for removing or rejecting frequencies higher than about 15 kilohertz. The clipped output signal from filter 42 is essentially a pulse signal, as shown for example in the central graph of FIG. 3.

To utilize the signal it is necessary to pass it through an inverter-amplifier, low-pass-filter 44 and pulse-shaping network 46. The low-pass-filter section of 44 has the capability of removing or rejecting frequencies higher than about 4 kilohertz. The resultant signal would resemble the pulse signal depicted in the lower graph of FIG. 3. This signal is believed to be more readily used for cylinder identification purposes than the signal shown in FIG. 1. For example the peak of the pulse is more distinct, and the width of the pulse is much greater. When the signal is used as a trigger for a flip-flop the greater width of the pulse is beneficial in avoiding timing problems, i.e., if the signal is present for a longer time interval then there is added assurance that the signal will be available when the cylinder compression measurement signal is developed and applied to the readout network.

It can be visualized from FIG. 3 that the character of the output pulse (lowermost curve in FIG. 3) is substantially unaffected by the peak value of the input sparking pulse (upper curve in FIG. 3). Experiments indicate that even though abnormal operating conditions might cause the peak spark zone voltage to be as low as 300 volts it is still possible, using this invention, to provide a pulse output suitable for triggering the engine compression tester logic (not shown).

I wish it to be understood that I do not desire to be limited to the exact details of construction shown and described for obvious modifications will occur to a person skilled in the art.

I claim:

1. In a cylinder compression test apparatus for a spark ignition engine: improved circuit means for generating an electrical pulse representing the firing cycle in a selected cylinder, said pulse-generating means comprising a signal attenuator having a hardwire connection to the high tension electrode in the spark plug for the selected cylinder, said attenuator having an output signal voltage whose magnitude is approximately one-tenth of 1 percent of the high tension voltage; a low-frequency-pass filter receiving the output of the attenuator, said filter having a capability for rejecting the attenuated highest voltage spike generated in the high tension electrode, while passing the attenuated high tension steady state signal occuring during the cylinder fire period; the filter output being essentially a pulse having a width that is approximately the same as the duration of the cylinder fire signal, whereby said pulse, after additional filtering and conditioning is suited to act as a trigger means for a digital-logic element, e.g. a flip-flop.

* * * * *